US012631501B2

(12) United States Patent
Yu

(10) Patent No.: US 12,631,501 B2
(45) Date of Patent: May 19, 2026

(54) DEVICE AND METHOD FOR ESTIMATING TEMPERATURE OF LOUDSPEAKER VOICE COIL

(71) Applicant: ELITE SEMICONDUCTOR MICROELECTRONICS TECHNOLOGY INC., Hsinchu (TW)

(72) Inventor: Wun-Long Yu, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 323 days.

(21) Appl. No.: 18/502,106

(22) Filed: Nov. 6, 2023

(65) Prior Publication Data

US 2025/0146887 A1    May 8, 2025

(51) Int. Cl.
*G01K 7/16* (2006.01)
*H04R 3/00* (2006.01)
*H04R 29/00* (2006.01)

(52) U.S. Cl.
CPC .............. *G01K 7/16* (2013.01); *H04R 3/007* (2013.01); *H04R 29/003* (2013.01); *H04R 2430/01* (2013.01)

(58) Field of Classification Search
CPC ...... G01K 7/16; G01K 2217/00; H04R 3/007; H04R 29/003; H04R 2430/01
USPC ........................................................ 374/185
See application file for complete search history.

(56) References Cited

U.S. PATENT DOCUMENTS

| | | | | |
|---|---|---|---|---|
| 6,940,981 | B2 * | 9/2005 | Neunaber | ................ H04R 3/00 |
| | | | | 330/297 |
| 9,131,302 | B2 * | 9/2015 | Williams | ................ H04R 9/022 |
| 9,538,303 | B2 * | 1/2017 | Gautama | ............. H04R 29/003 |
| 9,609,450 | B2 | 3/2017 | Yeh | |
| 10,250,978 | B1 | 4/2019 | Palit | |
| 10,582,300 | B2 * | 3/2020 | Bjork | ..................... H04R 3/007 |
| 11,457,311 | B1 * | 9/2022 | Carbo | .................... H04R 3/007 |

(Continued)

FOREIGN PATENT DOCUMENTS

WO       WO-2006043219 A1 *  4/2006  ............. H04R 3/002

OTHER PUBLICATIONS

Real-Time Voice-Coil Temperature and Cone Displacement Control of Loudspeakers, Oct. 28-31, 2004.*

*Primary Examiner* — Peter J Macchiarolo
*Assistant Examiner* — Mireille S Sadate-Moualeu

(57)        ABSTRACT

A device for estimating the temperature of a loudspeaker's voice coil includes a signal generator, a signal adjuster, an adder, and a temperature estimator. The signal generator generates and outputs an amplified signal to a loudspeaker according to a measurement signal and an audio signal, and senses a voltage and a current of the amplified signal to generate and output a sensory output. The signal adjuster generates and outputs an inverted signal according to the audio signal. The adder adds the sensory output and the inverted signal to generate a blended signal. The temperature estimator obtains an estimated resistance value of the loudspeaker's voice coil according to the blended signal, and generates a temperature signal according to the estimated resistance value, wherein the temperature signal indicates an estimated temperature value of the loudspeaker's voice coil. Additionally, a method for estimating the temperature of the loudspeaker voice coil is provided.

14 Claims, 4 Drawing Sheets

(56) References Cited

U.S. PATENT DOCUMENTS

| | | | | |
|---|---|---|---|---|
| 11,470,434 | B2 * | 10/2022 | Hernandez | H04R 3/007 |
| 2014/0126730 | A1 * | 5/2014 | Crawley | H04R 29/001 |
| | | | | 381/59 |
| 2018/0160245 | A1 * | 6/2018 | Polleros | H04R 29/003 |
| 2021/0409885 | A1 * | 12/2021 | Hernandez | G01K 7/16 |
| 2025/0146887 | A1 * | 5/2025 | Yu | G01K 7/16 |

* cited by examiner

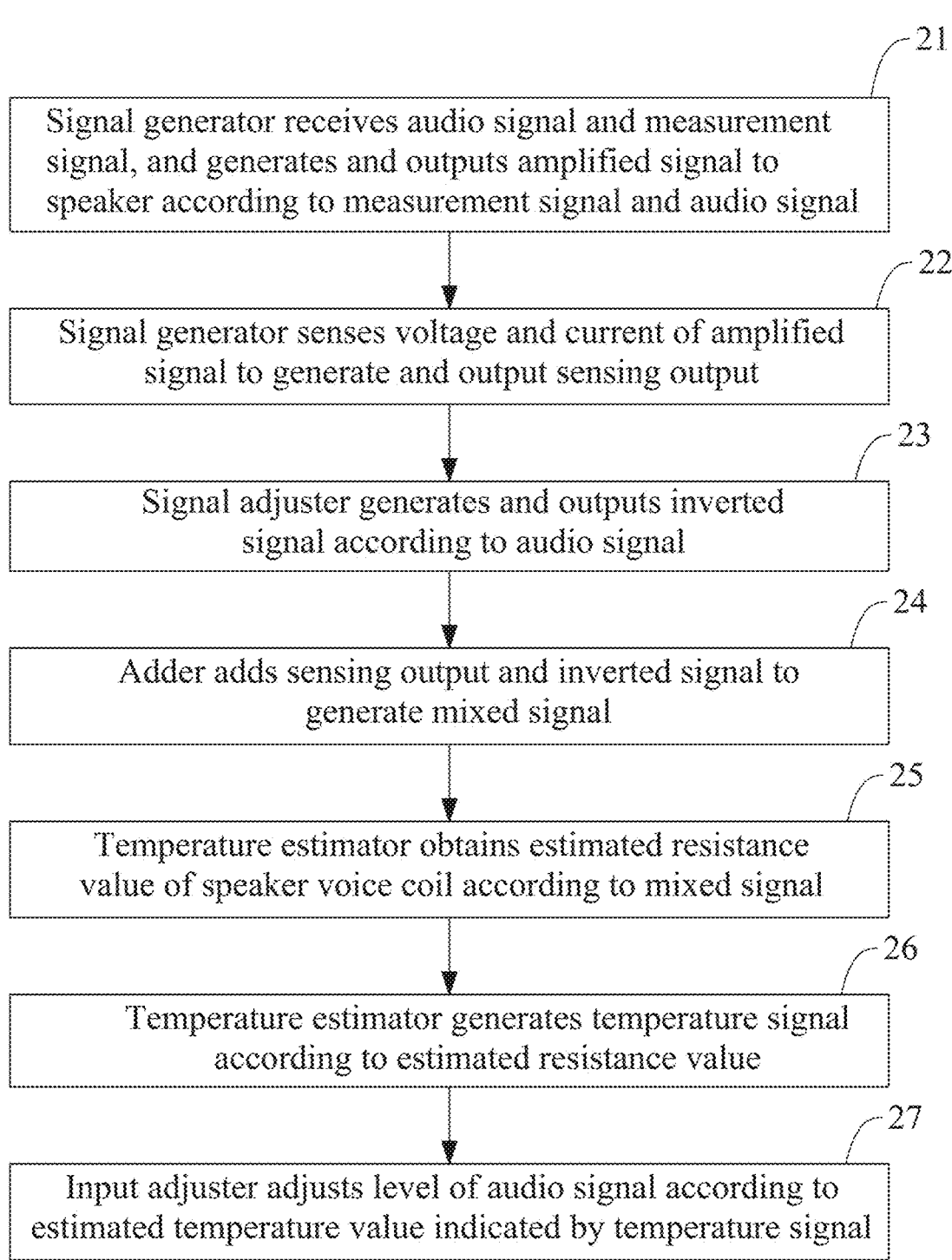

21

Signal generator receives audio signal and measurement signal, and generates and outputs amplified signal to speaker according to measurement signal and audio signal

22

Signal generator senses voltage and current of amplified signal to generate and output sensing output

23

Signal adjuster generates and outputs inverted signal according to audio signal

24

Adder adds sensing output and inverted signal to generate mixed signal

25

Temperature estimator obtains estimated resistance value of speaker voice coil according to mixed signal

26

Temperature estimator generates temperature signal according to estimated resistance value

27

Input adjuster adjusts level of audio signal according to estimated temperature value indicated by temperature signal

FIG. 3

DEVICE AND METHOD FOR ESTIMATING TEMPERATURE OF LOUDSPEAKER VOICE COIL

BACKGROUND OF THE INVENTION

1. Field of the Invention

The present disclosure relates to a device, a method, and a computer program product, and in particular to a device, a method, and a computer program product for estimating the temperature of a loudspeaker voice coil.

2. Description of the Related Art

Existing loudspeakers are devices that convert electrical signals into audio signals. A loudspeaker comprises a diaphragm, a voice coil, and other essential components. To reproduce audio signals, electric current is applied to the voice coil of the loudspeaker, leading to the generation of thermal energy in the voice coil. This thermal energy can affect playback characteristics of the loudspeaker, such as sound pressure and sound quality. Elevated operating temperature may further contribute to common loudspeaker defects. Therefore, real-time estimation of the temperature of the loudspeaker's voice coil is necessary to prevent the occurrence of defects in the loudspeaker.

BRIEF SUMMARY OF THE INVENTION

It is an object of the present disclosure to provide a device for estimating the temperature of a loudspeaker's voice coil, capable of enhancing the accuracy of voice coil temperature estimation, so as to solve the issue of inability of accurately estimating the temperature of a loudspeaker voice coil, which are adversely affected by audio signal interference, leading to inaccurate temperature assessments.

Consequently, the present disclosure comprising a signal generator, a signal adjuster, an adder, and a temperature estimator, serves as a device for estimating the temperature of a loudspeaker's voice coil.

The signal generator is configured to receive an audio signal and a measurement signal. It generates an amplified signal based on the measurement signal and the audio signal, outputting it to a loudspeaker. The voltage and current of the amplified signal are sensed to generate and output a sensory output. The signal adjuster receives the audio signal and generates and outputs an inverted signal based on the audio signal. The adder, coupled to the signal generator and the signal adjuster, receives the sensory output and the inverted signal, respectively, and adds the sensory output and the inverted signal to generate a blended signal. The temperature estimator is coupled to the adder receives the blended signal, and obtains a resistance estimate for the loudspeaker voice coil. Based on this resistance estimate, it generates a temperature signal indicating an estimated temperature value for the loudspeaker's voice coil temperature.

In the device for estimating the temperature of a loudspeaker voice coil according to some embodiments of the present disclosure, the measurement signal is a guided signal having a predetermined frequency which is a frequency within the range of frequencies inaudible to the human ear.

In the device for estimating the temperature of a loudspeaker's voice coil according to some embodiments of the present disclosure, the temperature estimator obtains, from the blended signal, a measured voltage and a measured current at the predetermined frequency. It then calculates the resistance estimate by dividing the measured voltage by the measured current.

In certain embodiments, the inverted signal of the device for estimating the temperature of a loudspeaker's voice coil has a first predetermined gain value, and the sensory output has a second predetermined gain value. The first predetermined gain value is the same as the second predetermined gain value.

In some embodiments of the present disclosure, the signal generator of the device for estimating the temperature of the loudspeaker's voice coil adds the measurement signal to the audio signal, amplifying the result to generate the amplified signal. Additionally, the signal adjuster functions as an inverter.

In some embodiments of the present disclosure, the signal adjuster of the device for estimating the temperature of a loudspeaker's voice coil comprises a delay circuit, configured to receive the audio signal and introduce a phase delay, thereby generating a delayed signal. Additionally, an inverter, coupled to the delay circuit receives the delayed signal and produces the inverted signal based on the delayed signal.

In some embodiments of the present disclosure, the device for estimating the temperature of the loudspeaker's voice coil further comprises an input adjuster, coupled to the temperature estimator to receive the temperature signal. It adjusts the alignment of the audio signal according to the estimated temperature value indicated by the temperature signal.

Another objective of the present disclosure is to provide a method for estimating the temperature of a loudspeaker's voice coil with enhanced accuracy for voice coil temperature estimation, so as to solve the issue of inability of accurately estimating the temperature of a loudspeaker's voice coil of the prior art.

A method for estimating the temperature of a loudspeaker's voice coil is performed by a device for estimating the temperature of a loudspeaker's voice coil, and includes the steps of (A) receiving an audio signal and a measurement signal, and generating and outputting an amplified signal to a loudspeaker according to the measurement signal and the audio signal; (B) sensing a voltage and a current of the amplified signal to generate and output a sensory output; (C) generating and outputting an inverted signal according to the audio signal; (D) adding the sensory output and the inverted signal to generate a blended signal; (E) obtaining an estimated resistance value of the loudspeaker voice coil according to the blended signal; and (F) generating a temperature signal according to the estimated resistance value, wherein the temperature signal indicates an estimated temperature value of the temperature of the loudspeaker's voice coil.

In the method for estimating the temperature of a loudspeaker voice coil according to some embodiments of the present disclosure, in step (A), the measurement signal is a guided signal having a predetermined frequency which is a frequency within an inaudible range to the human ear.

In the method for estimating the temperature of a loudspeaker's voice coil according to some embodiments of the present disclosure, step (E) includes the sub-steps of (E1) obtaining a measured voltage and a measured current based on the predetermined frequency; and (E2) dividing the measured voltage by the measured current to obtain the estimated resistance value.

In the method for estimating the temperature of a loudspeaker's voice coil according to some embodiments of the present disclosure, the inverted signal has a first predetermined gain value, and the sensory output has a second predetermined gain value, wherein the first predetermined gain value and the second predetermined gain value are the same.

In the method for estimating the temperature of a loudspeaker's voice coil according to some embodiments of the present disclosure, in step (A), the measurement signal and the audio signal are added and then amplified to generate the amplified signal.

In the method for estimating the temperature of a loudspeaker's voice coil according to some embodiments of the present disclosure, step (C) includes the sub-steps of (C1) delaying a phase of the audio signal to generate a delayed signal; and (C2) generating and outputting the inverted signal according to the delayed signal.

The method for estimating the temperature of a loudspeaker's voice coil according to some embodiments of the present disclosure further includes (G) adjusting a level of the audio signal according to the estimated temperature value indicated by the temperature signal.

The present disclosure provides the following effects. The inverted signal output by the signal adjuster and the sensory output are mixed to generate the blended signal, so that the blended signal includes only the measurement signal. The temperature estimator can accurately estimate the resistance of the voice coil directly according to the blended signal including only the measurement signal to obtain the estimated resistance value of the loudspeaker's voice coil. As such, the estimated temperature value indicated by the temperature signal generated by the temperature estimator according to the accurate estimated resistance value is also more accurate, further enhancing the temperature estimation accuracy of the loudspeaker's voice coil.

BRIEF DESCRIPTION OF THE DRAWINGS

Other features and effects of the present disclosure will become more readily apparent in the embodiments described with reference to the accompanying drawings.

FIG. 3 is a flowchart of a method of how to estimate the temperature of a loudspeaker's voice coil according to an embodiment of the present disclosure.

DETAILED DESCRIPTION OF THE INVENTION

In the following present disclosure, details of the present disclosure are given by way of the embodiments with reference to the accompanying drawings, so as to help a person skilled in the art to better understand the objects, features, and effects of the present disclosure. It should be noted that, in the description below and the appended claims, the terms "include" and "comprise" are used in the sense of an open manner, and are not to be construed as closed terms such as "consisting of . . . " Moreover, the term "couple" is intended to represent indirect or direct coupling. Thus, if one apparatus is coupled to another apparatus, the connection in between can be implemented by direct coupling or be implemented by indirect coupling achieved with another apparatus in between.

Figure 1:
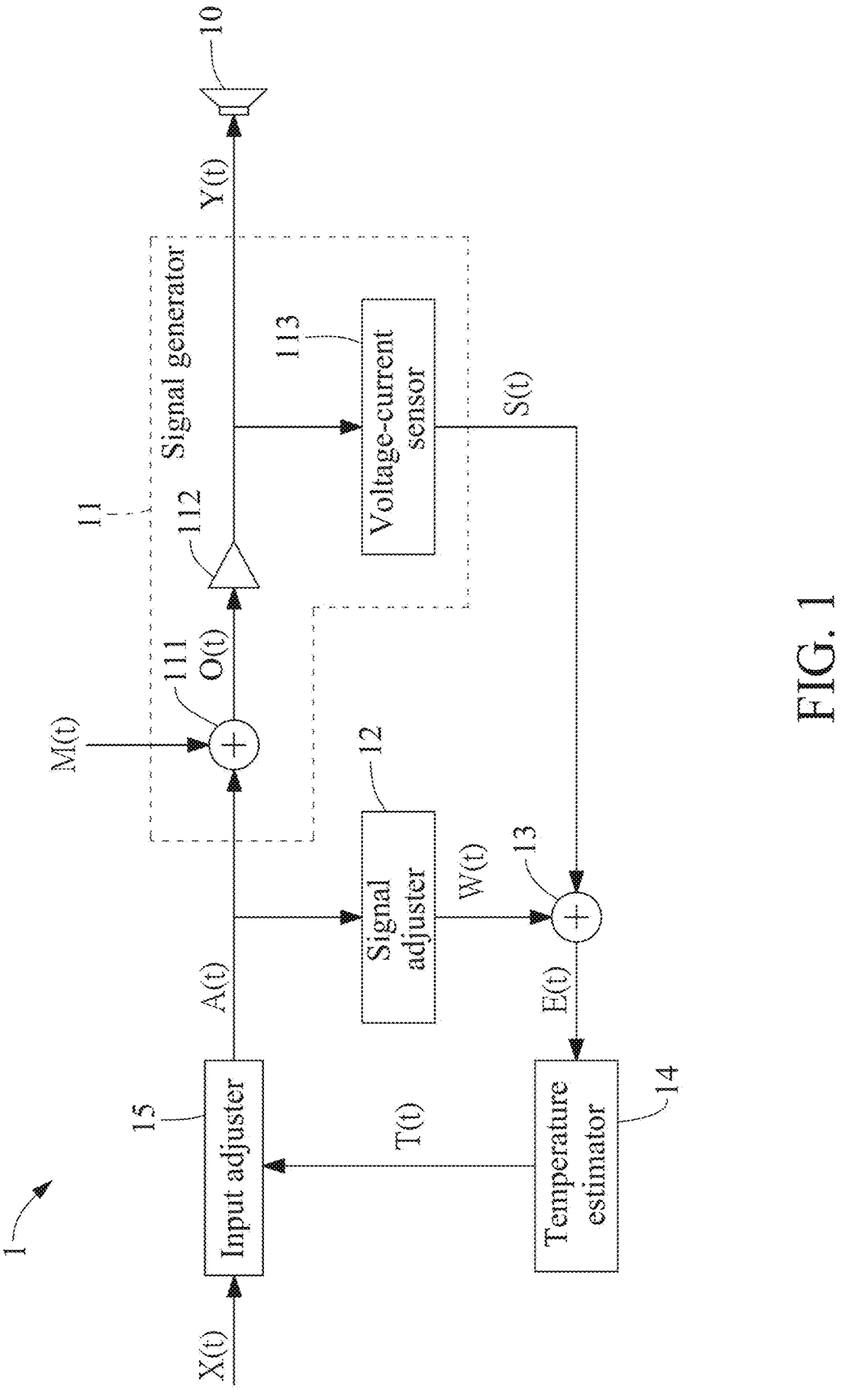
FIG. 1 is a circuit block diagram of a device for estimating the temperature of a loudspeaker's voice coil according to an embodiment of the present disclosure.

Refer to FIG. 1 showing a device 1 for estimating the temperature of a loudspeaker's voice coil according to an embodiment of the present disclosure. The device 1 includes a signal generator 11, a signal adjuster 12, an adder 13, a temperature estimator 14, and an input adjuster 15.

The signal generator 11 is for receiving an audio signal A(t) and a measurement signal M(t), and generates and outputs an amplified signal Y(t) to the loudspeaker 10 according to the measurement signal M(t) and the audio signal A(t), for the loudspeaker 10 to play a sound signal according to the amplified signal Y(t). The signal generator 11 senses a voltage and a current of the amplified signal Y(t) to generate and output a sensory output S(t). In this embodiment, the sensory output S(t) is a voltage-current sensory output. The loudspeaker 10 can be a micro loudspeaker used for a mobile device. The audio signal A(t) is, for example, a digital audio signal, and can include such as a speech or a sound effect. The signal generator 11 includes an adder 111, an amplifier 112, and a voltage-current sensor 113. The measurement signal M(t) is a guided signal having a predetermined frequency, and flows through the loudspeaker 10 so as to measure an impedance change of a voice coil. Since the loudspeaker's 10 voice coil is formed of assembly and winding of a metal coil, an estimated resistance value can be used to estimate the temperature of the loudspeaker's 10 voice coil according to a linearity relation between an equivalent resistance of the metal coil corresponding to the temperature. Moreover, a change occurs in the estimated resistance value of the loudspeaker's 10 voice coil after the loudspeaker 10 is driven by the amplified signal Y(t) including the measurement signal M(t). Thus, in order to estimate the temperature of the loudspeaker's 10 voice coil, the measurement signal M(t) is injected into an audio path and is mixed with the audio signal A(t), so as to determine the estimated resistance value of the voice coil by means of estimating the voltage and the current of the measurement signal M(t) in the mixed amplified signal Y(t), and to further estimate the temperature of the loudspeaker's 10 voice coil according to the estimated resistance value of the voice coil.

The adder 11 receives the audio signal A(t) and the measurement signal M(t), and adds the audio signal A(t) and the measurement signal M(t) to generate an output signal O(t). The amplifier 112 is coupled between the adder 111 and the loudspeaker 10, and receives the output signal O(t) from the adder 111, and amplifies the output signal O(t) to generate and output the amplified signal Y(t) to the loudspeaker 10. The voltage-current sensor 113 senses the voltage and the current of the amplified signal Y(t) to generate a sensory output S(t). In this embodiment, the adder 111 is a digital circuit element for performing an addition. The amplifier 112 can be an electronic amplifier for amplifying an audio signal. The voltage-current sensor 113 is a sensor for sensing voltages on two ends of the loudspeaker's 10 voice coil (not shown) and a current flowing into the voice coil, and can specifically be a product generally known to a person skilled in the technical field pertinent to the present disclosure.

Figure 2:
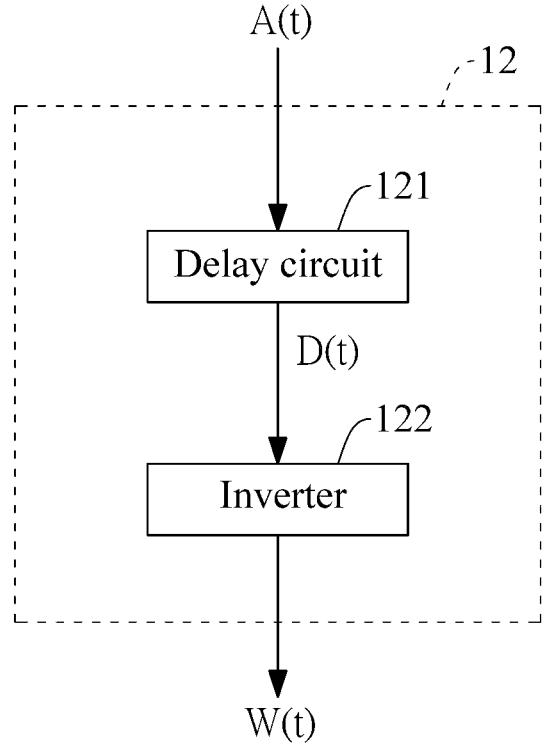
FIG. 2 is a block diagram of a signal adjuster of an embodiment of the present disclosure.

The signal adjuster 12 is for receiving the audio signal A (t), and generates and outputs an inverted signal W (t) according to the audio signal A (t). In this embodiment, the signal adjuster 12 is, for example but not limited to, an inverter. Further referring to FIG. 2, when the signal generator 11 has a transmission path latency, in other variation examples of this embodiment, the signal adjuster 12 includes a delay circuit 121 and an inverter 122. The delay circuit 121 receives the audio signal A (t), and delays a phase of the audio signal A (t) to generate a delayed signal D (t). The inverter 122 is coupled to the delay circuit 121 to receive the delayed signal D (t), and generates and outputs the inverted signal W (t) according to the delayed signal D (t), wherein phases of the inverted signal W (t) and the delayed signal D (t) have a phase difference of 180 degrees. More specifically, the audio signal A (t) is first delayed by the delay circuit 121 according to a predetermined delay period to generate the delayed signal D (t), and then the inverted signal W (t) is generated according to the delayed signal D (t). Thus, a signal starting point of the inverted signal W (t) can be the same as a signal starting point of the sensory output S (t) output by the voltage-current sensor 113, further preventing the transmission path latency of the signal generator 11 from causing the signal starting point of the inverted signal W (t) to be different from the signal starting point of the sensory output S (t). In this embodiment, the delay circuit 121 is a phase delay circuit, and can be implemented by a buffer. The inverter 122 can be implemented by, for example, a logic gate, or be implemented by an N-type metal-oxide semiconductor field-effect transistor (MOSFET) or a P-type MOSFET connected to a resistor.

The adder 13 is coupled to the signal generator 11 and the signal adjuster 12 to receive the sensory output S(t) and the inverted signal W(t), respectively, and adds the sensory output S(t) and the inverted signal W(t) to generate a blended signal E(t). In this embodiment, the adder 13 is a digital circuit element for performing an addition.

More specifically, in this embodiment, when the inverted signal output by the signal adjuster 12 is represented by W(t), and the audio signal is represented by A(t), W(t)=−G1. A(t), where the parameter G1 is the first predetermined gain value. Moreover, when the sensory output is represented by S(t) and the measurement signal is represented by M(t), S(t)=G2. [A(t)+M(t)], where the parameter G2 is the second predetermined gain value. When the blended signal output by the adder 13 is represented by E(t), E(t)=W (T)+S(t)=−G1. A(t)+G2. [A(t)+M(t)]. The first predetermined gain value G1 and the second predetermined gain value G2 are the same. When the signal generator 11 does not contain any transmission path latency and the first predetermined gain value G1 and the second predetermined gain value G2 are the same, E(t)=M(t).

The temperature estimator 14 is coupled to the adder 13 to receive the blended signal E(t), obtains the estimated resistance value of the loudspeaker's 10 voice coil according to the blended signal E(t), and generates a temperature signal T(t) according to the estimated resistance value. The temperature signal T(t) indicates an estimated temperature value of the loudspeaker's 10 voice coil. In this embodiment, the temperature estimator 14 obtains the measured voltage and the measured current under the predetermined frequency from the blended signal E(t), and divides the measured voltage by the measured current to obtain the estimated resistance value. More specifically, it is known from the description above that, the blended signal E(t) output by the adder 13 to the temperature estimator 14 includes only the measurement signal M(t), and a change occurs in the estimated resistance value of the loudspeaker's 10 voice coil when the loudspeaker 10 is driven by the amplified signal Y(t) including the measurement signal M(t). Thus, the temperature estimator 14 can accurately obtain the estimated resistance value of the loudspeaker's 10 voice coil by means of estimating the voice coil resistance directly according to the blended signal E(t) including only the measurement signal M(t). As such, the estimated temperature value indicated by the temperature signal T(t) generated by the temperature estimator 14 according to the accurate estimated resistance value is also more accurately, further enhancing the temperature estimation accuracy of the loudspeaker's 10 voice coil and hence improving an unsatisfactory accuracy of the prior art. In the prior art, a signal for estimating the voice coil resistance includes an audio signal and a measurement signal, such that a conventional method for estimating the temperature of a loudspeaker's voice coil is affected by the audio signal and is unable to accurately obtain the estimated resistance value of the loudspeaker's voice coil, resulting an unsatisfactory accuracy of the temperature of the loudspeaker's voice coil estimated according to the obtained estimated voice coil resistance value (which is hardly accurate) as in the prior art.

In this embodiment, the temperature estimator 14 includes, for example, a filter (not shown), a resistance calculator (not shown) and a temperature converter (not shown). The filter is coupled to the adder 13 to receive the blended signal E(t), and generates a filtered signal according to the blended signal E(t). The resistance calculator is coupled to the filter to receive the filtered signal, obtains the measured voltage and the measured current under the predetermined frequency from the filtered signal, and divides the measured voltage by the measured current to obtain the estimated resistance value of the loudspeaker's 10 voice coil. The temperature converter is coupled to the resistance calculator to obtain the estimated resistance value, and calculates the estimated temperature value according to the estimated resistance value to generate the temperature signal T(t). In this embodiment, each of the resistance calculator and the temperature converter can be a central processing unit (CPU) formed by one or more integrated circuits, and specifically be formed by a programmable integrated circuit, and is in charge of performing operations of program codes to generate operation results. Moreover, a temperature estimation equation (1) below is used in this embodiment to obtain the estimated temperature value.

$$Re(T) = Re(T0) \cdot \{1 + \alpha_0(T - T0)\} \qquad \text{Equation (1)}$$

In Equation (1) above, the parameter T represents the estimated temperature value, the parameter $T_0$ represents a predetermined temperature, the parameter Re(T) represents the estimated resistance value of the loudspeaker's 10 voice coil under the estimated temperature value, $Re(T_0)$ represents the estimated resistance value of the loudspeaker's 10 voice coil under the predetermined temperature value $T_0$, and $\alpha_0$ represents a resistivity thermal coefficient of the voice coil and is determined by the material of the voice coil.

The input adjuster 15 is for generating an adjusted audio signal A(t) according to the digital audio signal X(t). The input adjuster 15 is coupled to the temperature estimator 14 to receive the temperature signal T(t), and adjusts the level of the audio signal A(t) according to the estimated temperature value indicated by the temperature signal T(t), so as to ensure that an output level of the amplified signal Y(t) is within a safe range and the temperature of the loudspeaker's 10 voice coil does not exceed a user-predetermined threshold temperature. For example, when the input adjuster 15 determines according to the temperature signal T(t) that the estimated temperature value is higher than the threshold temperature, it means that the temperature of the loudspeaker's 10 voice coil is higher than an acceptable limit. Thus, the input adjuster 15 can lower the level of the audio signal A(t) to ensure that the output level of the amplified signal Y(t) is within a safe range, so as to prevent the temperature of the loudspeaker's 10 voice coil from getting higher than the threshold temperature, further preventing defects of the loudspeaker 10 (for example, thermal damage of the loudspeaker 10 caused by high temperatures). The input adjuster 15 can be, for example, a general-purpose or audio processing microprocessor, a field programmable gate array (FPGA), an application-specific integrated circuit (ASIC), or other similar elements, or a combination of the above.

Refer to FIG. 3 showing a flowchart of a method for estimating the temperature of a loudspeaker's voice coil performed by the device 1 for estimating the temperature of a loudspeaker's voice coil of the present disclosure. The method for estimating the temperature of a loudspeaker's voice coil of the present disclosure includes steps 21 to 27 below.

In step 21, the signal generator 11 receives an audio signal A(t) and a measurement signal M(t), and generates and outputs an amplified signal Y(t) to the loudspeaker 10 according to the measurement signal M(t) and the audio signal A(t). In this embodiment, the signal generator 11 adds and then amplifies the measurement signal M(t) and the audio signal A(t) to generate an amplified signal Y(t).

In step 22, the signal generator 11 senses a voltage and a current of the amplified signal Y(t) to generate and output a sensory output S(t).

In step 23, the signal adjuster 23 generates and outputs an inverted signal W(t) according to the audio signal A(t). When the signal generator 11 has a transmission path latency, in other variation examples of this embodiment, the signal adjuster 12 first delays a phase of the audio signal A(t) to generate a delayed signal D(t), and then generates and outputs an inverted signal W(t) according to the delayed signal D(t).

In step 24, the adder 13 adds the sensory output S(t) and the inverted signal W(t) to generate a blended signal E(t).

Figure 4:
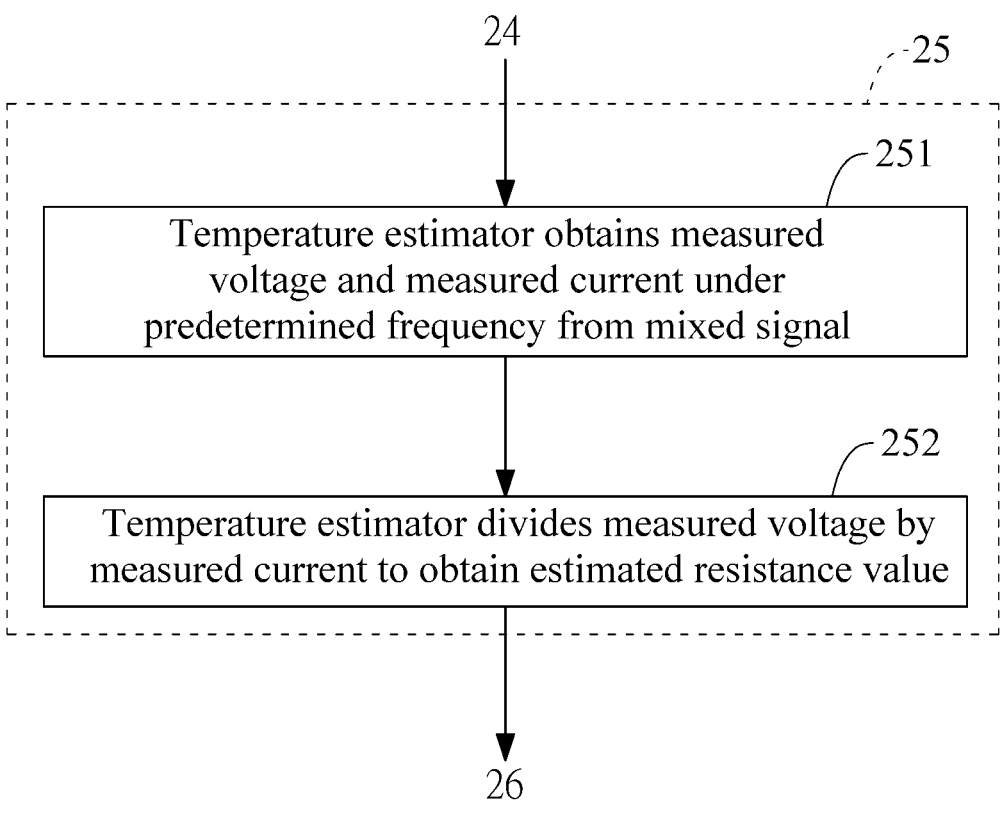
FIG. 4 is a flowchart of a method for estimating the temperature of a loudspeaker's voice coil and obtains an estimated resistance value of the loudspeaker's voice coil according to an embodiment of the present invention.

In step 25, the temperature estimator 14 obtains an estimated resistance value of the loudspeaker's 10 voice coil according to the blended signal E(t). In this embodiment, further referring to FIG. 4, step 25 includes the sub-steps of sub-step 251, in which the temperature estimator 14 obtains a measured voltage and a measured current under the predetermined frequency from the blended signal E(t); and sub-step 252, in which the temperature estimator 14 divides the measured voltage by the measured current to obtain the estimated resistance value.

In step 26, the temperature estimator 14 generates a temperature signal T(t) according to the estimated resistance value.

In step 27, the input adjuster 15 adjusts a level of the audio signal A(t) according to an estimated temperature value indicated by the temperature signal T(t).

A computer program product for estimating the temperature of a loudspeaker's voice coil is further provided according to an embodiment of the present disclosure. The computer program product is an application that can be stored in a computer-readable storage medium and can be run by an electronic device (not shown, for example, a cellphone, tablet computer, laptop computer, or desktop computer). When the electronic device loads and runs the computer program product, the computer program product causes the electronic device to serve as the device 1 for estimating the temperature of a loudspeaker's voice coil provided by the present disclosure, further implementing the method for estimating the temperature of a loudspeaker's voice coil provided by the present disclosure.

In conclusion, the device 1, the method, and the computer program product for estimating the temperature of a loudspeaker's voice coil provided by the present disclosure, the inverted signal W(t) output by the signal adjuster 12 and the sensory output S(t) are mixed to generate the blended signal E(t), so that the blended signal E(t) includes only the measurement signal M(t). Moreover, the estimated resistance value of the loudspeaker's 10 voice coil changes along with a change in the measurement signal M(t), so the temperature estimator 14 can estimate the resistance of the voice coil directly according to the blended signal E(t) including only the measurement signal M(t) to accurately obtain the estimated resistance value of the loudspeaker's 10 voice coil. As such, the estimated temperature value indicated by the temperature signal T(t) generated by the temperature estimator 14 according to the accurate estimated resistance value is also more accurate, further enhancing the temperature estimation accuracy of the loudspeaker's 10 voice coil.

The description above provides merely preferred embodiments of the present application, and is not to be construed as limitations to the scope of implementation of the present invention. All simple and equivalent variations and modifications made based on the scope of claims and the description of the present application are to be encompassed within the scope of the present application.

What is claimed is:

1. A device for estimating the temperature of a loudspeaker's voice coil, comprising:
   a signal generator, configured to receive an audio signal and a measurement signal, generate and output an amplified signal to a loudspeaker according to the measurement signal and the audio signal, and sense a voltage and a current of the amplified signal to generate and output a sensory output;
   a signal adjuster, configured to receive the audio signal, and generate and output an inverted signal according to the audio signal;
   an adder, coupled to the signal generator and the signal adjuster to receive the sensory output and the inverted signal, respectively, configured to add the sensory output and the inverted signal to generate a blended signal; and
   a temperature estimator, coupled to the adder to receive the blended signal, configured to obtain an estimated resistance value of the loudspeaker's voice coil according to the blended signal, and generate a temperature signal according to the estimated resistance value, wherein the temperature signal indicates an estimated temperature value of the loudspeaker's voice coil.

2. The device according to claim 1, wherein the measurement signal is a guided signal having a predetermined frequency which is a frequency within an inaudible range to a human ear.

3. The device according to claim 2, wherein the temperature estimator obtains a measured voltage and a measured current under the predetermined frequency from the blended signal, and divides the measured voltage by the measured current to obtain the estimated resistance value.

4. The device according to claim 1, wherein the inverted signal has a first predetermined gain value, the sensory output has a second predetermined gain value, and the first predetermined gain value and the second predetermined gain value are the same.

5. The device according to claim 1, wherein the signal generator adds and then amplifies the measurement signal and the audio signal to generate the amplified signal, and the signal adjuster is an inverter.

6. The device according to claim 1, wherein the signal adjuster comprises:

a delay circuit, configured to receive the audio signal, and delay a phase of the audio signal to generate a delayed signal; and an inverter, coupled to the delay circuit to receive the delayed signal, configured to generate and output the inverted signal according to the delayed signal.

7. The device according to claim 1, further comprising:

an input adjuster, coupled to the temperature estimator to receive the temperature signal, configured to adjust a level of the audio signal according to the estimated temperature value indicated by the temperature signal.

8. A method for estimating the temperature of a loudspeaker's voice coil, performed by a device for estimating the temperature of a loudspeaker's voice coil, the method comprising steps of:

(A) receiving an audio signal and a measurement signal, and generating and outputting an amplified signal to a loudspeaker according to the measurement signal and the audio signal;

(B) sensing a voltage and a current of the amplified signal to generate and output a sensory output;

(C) generating and outputting an inverted signal according to the audio signal;

(D) adding the sensory output and the inverted signal to generate a blended signal;

(E) obtaining an estimated resistance value of the loudspeaker's voice coil according to the blended signal; and (F) generating a temperature signal according to the estimated resistance value, wherein the temperature signal indicates an estimated temperature value of the loudspeaker's voice coil.

9. The method according to claim 8, wherein in step (A), the measurement signal is a guided signal having a predetermined frequency which is a frequency within an inaudible range to a human ear.

10. The method according to claim 9, wherein step (E) comprises sub-steps of:

(E1) obtaining a measured voltage and a measured current under the predetermined frequency from the blended signal; and (E2) dividing the measured voltage by the measured current to obtain the estimated resistance value.

11. The method according to claim 8, wherein the inverted signal has a first predetermined gain value, the sensory output has a second predetermined gain value, and the first predetermined gain value and the second predetermined gain value are the same.

12. The method according to claim 8, wherein in step (A), the measurement signal and the audio signal are added and amplified to generate the amplified signal.

13. The method according to claim 8, wherein step (C) comprises sub-steps of:

(C1) delaying a phase of the audio signal to generate a delayed signal; and (C2) generating and outputting an inverted signal according to the delayed signal.

14. The method according to claim 8, further comprising:

(G) adjusting a level of the audio signal according to the estimated temperature value indicated by the temperature signal.

* * * * *